US011101656B2

(12) United States Patent
Yamanaka (10) Patent No.: US 11,101,656 B2
(45) Date of Patent: Aug. 24, 2021

(54) REACTIVE POWER COMPENSATION DEVICE AND METHOD FOR CONTROLLING THE SAME (71) Applicant: Mitsubishi Electric Corporation, Tokyo (JP)

(72) Inventor: Daisuke Yamanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 91 days.

(21) Appl. No.: 16/500,493

(22) PCT Filed: May 18, 2017

(86) PCT No.: PCT/JP2017/018667
§ 371 (c)(1),
(2) Date: Oct. 3, 2019

(87) PCT Pub. No.: WO2018/211658
PCT Pub. Date: Nov. 22, 2018

(65) Prior Publication Data
US 2020/0112172 A1    Apr. 9, 2020

(51) Int. Cl.
*H02J 3/18* (2006.01)
*H02M 1/36* (2007.01)
(Continued)

(52) U.S. Cl.
CPC ........... *H02J 3/1857* (2013.01); *H02H 3/247* (2013.01); *H02M 1/36* (2013.01); *H02M 2007/4835* (2013.01)

(58) Field of Classification Search
CPC ......... H02J 3/1857; H02M 2007/4835; H02M 1/36; H02H 3/247
See application file for complete search history.

(56) References Cited

U.S. PATENT DOCUMENTS

2008/0304188 A1    12/2008    Ichinose et al.
2014/0077767 A1*    3/2014    Hasler ............... H02J 3/1857
                                                        320/128
(Continued)

FOREIGN PATENT DOCUMENTS

EP    2549634 A1    1/2013
EP    3012936 A1    4/2016
(Continued)

OTHER PUBLICATIONS

International Search Report (with English translation) and Written Opinion issued in corresponding International Patent Application No. PCT/JP2017/018667, 9 pages (dated Jul. 25, 2017).
(Continued)

*Primary Examiner* — Harry R Behm
(74) *Attorney, Agent, or Firm* — Buchanan Ingersoll & Rooney PC (57) ABSTRACT A reactive power compensation device is connected with an AC power system via a switch, and includes an arm circuit having a plurality of sub-modules connected in series, and a central control protection device. Each of the sub-modules includes a DC capacitor, and a bridge circuit for switching whether or not to output a voltage held in the DC capacitor. The central control protection device is configured to shift to a standby mode in which all semiconductor switching elements constituting the bridge circuit of each of the sub-modules are set to an opened state, with the switch being set to a closed state, when the AC power system has a power failure during operation of the reactive power compensation device, and to shift from the standby mode to a stop mode in which the switch is set to an opened state.

11 Claims, 9 Drawing Sheets

(51) Int. Cl.
    *H02H 3/247*    (2006.01)
    *H02M 7/483*    (2007.01)

(56) References Cited

U.S. PATENT DOCUMENTS

| | | | |
|---|---|---|---|
| 2015/0340859 A1* | 11/2015 | Barker | H02H 7/12 |
| | | | 361/62 |
| 2017/0126127 A1 | 5/2017 | Koyanagi et al. | |
| 2019/0288509 A1* | 9/2019 | Buchmann | H02J 3/1857 |
| 2020/0044580 A1* | 2/2020 | Stankewitz | H02H 7/12 |
| 2020/0119659 A1* | 4/2020 | Shinomiya | H02M 7/49 |

FOREIGN PATENT DOCUMENTS

| | | |
|---|---|---|
| JP | 2001045667 A | 2/2001 |
| JP | 2013243934 A | 12/2013 |
| JP | 2013255422 A | 12/2013 |
| JP | 2014082809 A | 5/2014 |
| JP | 2016032325 A | 3/2016 |
| JP | 2016100926 A | 5/2016 |
| WO | 2011013187 A1 | 2/2011 |
| WO | 2016002319 A1 | 1/2016 |
| WO | 2017004146 A1 | 1/2017 |

OTHER PUBLICATIONS

Extended European Search Report dated Mar. 10, 2020, for corresponding European patent application No. 17910419.5, 8 pages.
Office Action dated Apr. 20, 2021 issued in corresponding European Patent Application No. 17910419.5 (7 pages).

* cited by examiner

REACTIVE POWER COMPENSATION DEVICE AND METHOD FOR CONTROLLING THE SAME

TECHNICAL FIELD

The present disclosure relates to a reactive power compensation device and a method for controlling the same, and is used in particular in a reactive power compensation device using a modular multilevel converter (MMC).

BACKGROUND ART

Reactive power compensation devices can adopt a variety of circuit methods. As an exemplary reactive power compensation device using a voltage-sourced converter, a reactive power conversion device using an MMC has been known. The MMC is configured with a number of unit power conversion circuits called sub-modules connected in series. When some of the sub-modules fail, the MMC can continue its operation using the remaining sub-modules, by bypassing the failed sub-modules.

As disclosed for example in PTL 1 (Japanese Patent Laying-Open No. 2013-255422), PTL 2 (Japanese Patent Laying-Open No. 2014-082809), PTL 3 (WO 2016/002319), and the like, each sub-module includes, a main circuit configured with a plurality of switching elements and a direct current (DC) capacitor; two external terminals to be connected in series with other cell converters; a bypass switch both ends of which are connected to the two external terminals; and a self-contained power supply configured to obtain energy from the DC capacitor of the main circuit and drive the bypass switch and the like. When the voltage of the DC capacitor or the output voltage of the self-contained power supply becomes less than a lower limit value due to a failure of each sub-module, the MMC is stopped for protection.

CITATION LIST

Patent Literature

PTL 1: Japanese Patent Laying-Open No. 2013-255422
PTL 2: Japanese Patent Laying-Open No. 2014-082809
PTL 3: WO 2016/002319

SUMMARY OF INVENTION

Technical Problem

Rather than dealing with a failure of a sub-module as described in the above patent literatures, the present disclosure is intended to deal with a case where an alternating current (AC) system voltage is reduced due to a failure of an AC power system to which a reactive power compensation device is connected. The inventor of the present application recognizes that the above ease has the following problem.

Specifically, the DC capacitor serving as a supply source of a control power supply for each sub-module is charged by obtaining energy from the AC power system. Accordingly, if a power failure occurs in the AC power system, the DC capacitor is gradually discharged and its voltage is reduced even when the sub-module itself does not have a failure, and thereby it becomes impossible to control the sub-module. On the other hand, when power is restored to the AC power system after the power failure, it is desirable to restart the reactive power compensation device as soon as possible.

The present disclosure takes the aforementioned problem into consideration, and a main object thereof is to provide a reactive power compensation device that can be restarted as soon as possible when power is restored to an AC power system after a power failure.

Solution to Problem

A reactive power compensation device of an embodiment is connected with an AC power system via a switch, and includes an arm circuit having a plurality of sub-modules connected in series, and a central control protection device. Each of the sub-modules includes a DC capacitor, and a bridge circuit for switching whether or not to output a voltage held in the DC capacitor. The central control protection device is configured to control the sub-modules and the switch. The central control protection device is configured to shift to a standby mode in which all semiconductor switching elements constituting the bridge circuit of each of the sub-modules are set to an opened state, with the switch being set to a closed state, when the AC power system has a power failure during operation of the reactive power compensation device, and to shift from the standby mode to a stop mode in which the switch is set to an opened state.

Advantageous Effects of Invention

According to the above embodiment, by providing the standby mode, the reactive power compensation device can be restarted as soon as possible when power is restored to the AC power system in the state of the standby mode after the AC power system has a power failure.

DESCRIPTION OF EMBODIMENTS

Hereinafter, each embodiment will be described in detail with reference to the drawings. It should be noted that identical or corresponding parts will be designated by the same reference numerals, and the description thereof will not be repeated.

First Embodiment

[Overall Configuration of Reactive Power Compensation Device]

Figure 1:
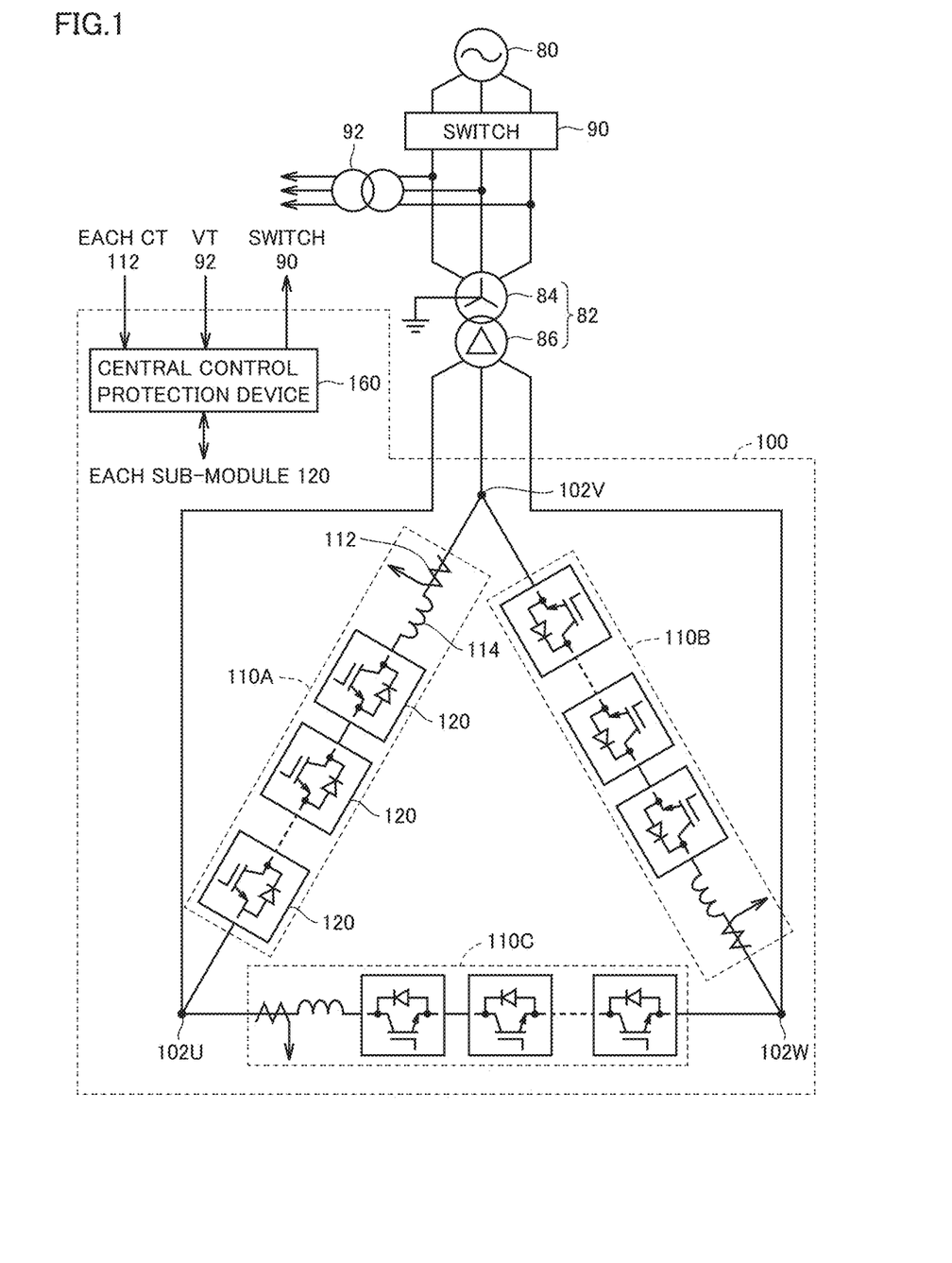
FIG. 1 is a diagram showing an example of a configuration of a reactive power compensation device.

FIG. 1 is a diagram showing an example of a configuration of a reactive power compensation device. Referring to FIG. 1, a reactive power compensation device 100 is connected with an AC power system via a transformer 82 and a switch 90.

Switch 90 opens and closes an electric path between AC power system 80 and reactive power compensation device 100.

Reactive power compensation device 100 generates an AC voltage to be output to AC power system 80. In particular, reactive power compensation device 100 of the present embodiment is configured with a voltage-sourced converter, and is also called static synchronous compensator (STATCOM).

More specifically, reactive power compensation device 100 includes a plurality of arm circuits 110A, 110B and 110C, and a central control protection device 160. In the following description, when arm circuits 110A, 110B, and 110C are collectively referred to or any of arm circuits 110A, 110B, and 110C is referred to, an expression "arm circuit 110" is used.

Each arm circuit 110 includes a number of sub-modules 120 connected in series, a reactor 114 connected in series with these sub-modules, and a current transformer (CT) 112 for detecting a current flowing to arm circuit 110. Thus, reactive power compensation device 100 is configured based on an MMC including a number of sub-modules 120, which are power converters, connected in series. A specific exemplary configuration of each sub-module 120 will be described later with reference to FIG. 2.

It should be noted that current transformer 112 and reactor 114 may be provided at any position with respect to a plurality of sub-modules 120 connected in series. In addition, a plurality of reactors 114 may be provided.

In the case of FIG. 1, arm circuits 110A, 110B, and 110C are Δ-connected. That is, arm circuit 110A is connected between a U-phase node 102U and a V-phase node 102V, arm circuit 110B is connected between node 102V and a W-phase node 102W, and arm circuit 110C is connected between node 102W and node 102U. Alternatively, arm circuits 110A, 110B, and 110C may be Y-connected. Further, reactive power compensation device 100 may be configured with double Y-connected arm circuits, or may be configured with double Δ-connected arm circuits, or may be configured with a plurality of arm circuits connected by another connection method.

Central control protection device 160 receives an input with an amount indicating the value of a voltage of AC power system 80, from a voltage transformer (VT) 92 attached to an electric path between transformer 82 and switch 90, and receives an input with an amount indicating the value of a current flowing to each arm circuit 110, from current transformer 112 provided in each arm circuit 110. Further, central control protection device 160 obtains information of a voltage held in a DC capacitor constituting each sub-module, by communicating with each sub-module 120 by optical communication via optical fibers.

Based on the above detection values, central control protection device 160 controls operation of each sub-module 120, and also controls switching operation of switch 90. For example, in the case of normal operation, central control protection device 160 controls each sub-module 120 such that the AC voltage to be output gets closer to an AC voltage target value received from the outside.

[Configuration of Each Sub-Module]

Figure 2:
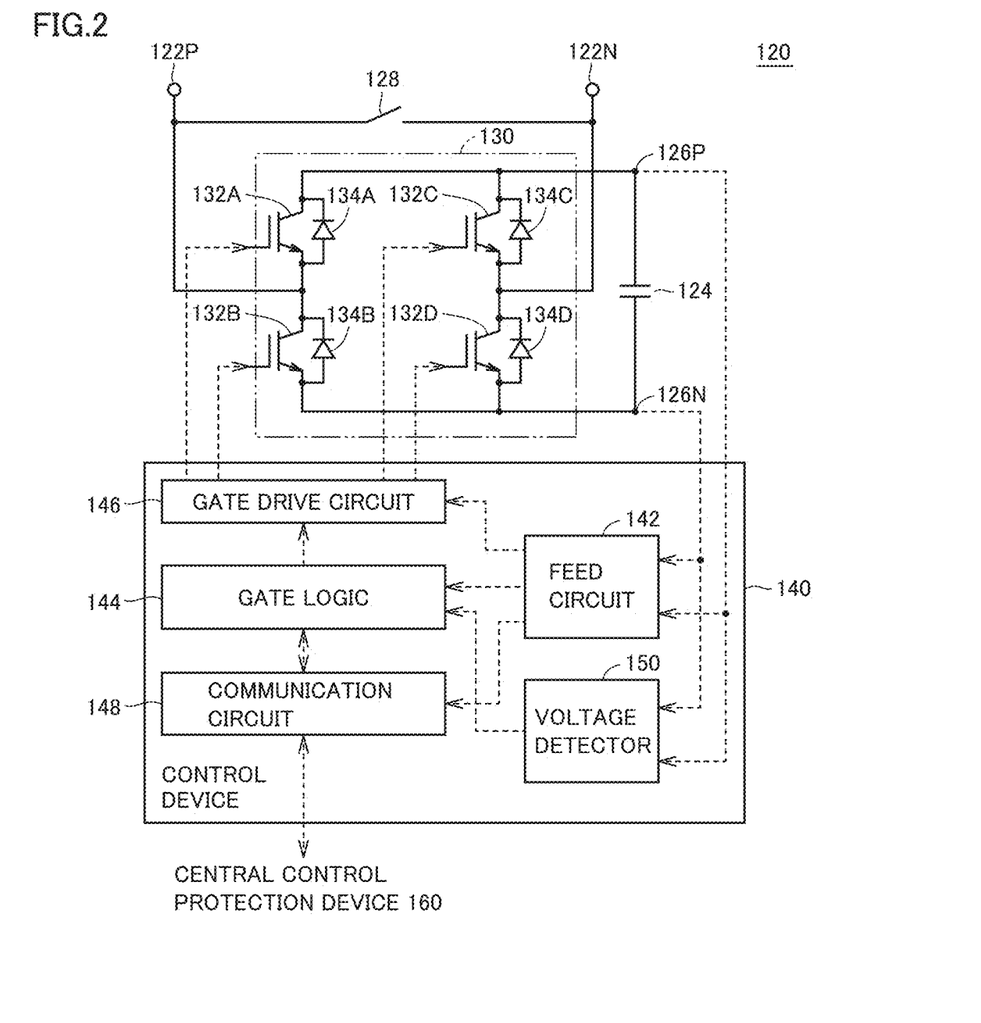
FIG. 2 is a diagram showing an example of a configuration of a sub-module in FIG. 1.

FIG. 2 is a diagram showing an example of a configuration of a sub-module in FIG. 1. Sub-module 120 shown in FIG. 2 includes a first input/output node 122P, a second input/output node 122N, a full bridge-type bridge circuit 130, a DC capacitor 124 serving as an energy storage unit, a switch 128, and a control device 140.

Input/output node 122P (122N) is connected with input/output node 122N (122P) of an adjacent sub-module 120. However, in sub-module 120 located at the very end of arm circuit 110, input/output node 122P, 122N may be connected with node 102U or 102V or 102W.

Bridge circuit 130 includes semiconductor switching elements 132A, 132B, 132C, and 132D, and diodes 134A, 134B, 134C, and 134D. Semiconductor switching element 132A is connected between a high potential-side node 126P of DC capacitor 124 and input/output node 122P. Semiconductor switching element 132B is connected between input/output node 122P and a low potential-side node 126N of DC capacitor 124. Semiconductor switching element 132C is connected between high potential-side node 126P and input/output node 122N. Semiconductor switching element 132D is connected between input/output node 122N and low potential-side node 126N. Diodes 134A, 134B, 134C and 134D are connected in anti-parallel (in parallel and in a reverse bias direction) with semiconductor switching elements 132A, 132B, 132C, and 132D, respectively.

As each of semiconductor switching elements 132A, 132B, 132C, and 132D, for example, semiconductor elements having turn-off capability such as an insulated gate bipolar transistor (IGBT) or a gate commutated turn-off thyristor (GCT) is used.

As bridge circuit 130, a half bridge-type or three quarter-type bridge circuit can be used instead of the full bridge-type bridge circuit in FIG. 2. In the case of the half bridge-type bridge circuit, the bridge circuit is not provided with semiconductor switching elements 132C and 132D and diodes 134C and 134D in the configuration of FIG. 2. In this case, second input/output node 122N is connected to low potential-side node 126N of DC capacitor 124. In the case of the three quarter-type bridge circuit, the bridge circuit is not provided with semiconductor switching element 132C in the configuration of FIG. 2.

Switch 128 is connected between input/output node 122P and input/output node 122N. Switch 128 is initially in an opened state, and when sub-module 120 fails, switch 128 is switched to a closed state based on a command from a gate logic 144. Thereby, an arm current bypasses failed sub-module 120.

Control device 140 includes a voltage detector 150, a feed circuit 142, a communication circuit 148, gate logic 144, and a gate drive circuit 146.

Voltage detector 150 detects a DC voltage held in DC capacitor 124 (also referred to as a DC capacitor voltage or a capacitor voltage). As voltage detector 150, for example, a direct current voltage transformer (DCVT) can be used. The voltage of DC capacitor 124 detected by voltage detector 150 is transmitted to central control protection device 160 by communication circuit 148.

Feed circuit 142 generates drive voltages having various magnitudes required in control device 140, based on the voltage stored in DC capacitor 124. Accordingly, when reactive power compensation device 100 is started, feed circuit 142 starts operation after the voltage is stored in DC capacitor 124, and thereby other circuits constituting control device 140 are operated.

Communication circuit 148 communicates with central control protection device 160. For this communication, optical communication using optical fibers is performed, from the viewpoint of noise resistance. Communication circuit 148 transmits various kinds of information in sub-module 120 (for example, the voltage of DC capacitor 124, failure information, and the like) toward central control protection device 160.

Gate logic 144 generates an on/off command for controlling turning on/off of semiconductor switching elements 132A, 132B, 132C, and 132D, based on a control command and a protection command received from central control protection device 160 via communication circuit 148. Gate drive circuit 146 generates gate drive voltages for semiconductor switching elements 132A, 132B, 132C, and 132D, based on the on/off command from gate logic 144.

Further, gate logic 144 is configured to determine a plurality of abnormal modes in sub-module 120, using the capacitor voltage detected by voltage detector 150 and detection values detected by a plurality of sensors (not shown). When an abnormal mode is detected, sub-module 120 sets switch 128 to the closed state. Examples of the abnormal modes include a case where each of the capacitor voltage and the drive voltages generated in feed circuit 142 does not fall within a predetermined appropriate range.

Gate logic 144 described above may be configured as a dedicated circuit, or may be configured using a field programmable gate array (FPGA). Alternatively, the function of gate logic 144 may be implemented by a microcomputer including a central processing unit (CPU), a memory, and the like.

[Functional Configuration of Central Control Protection Device]

Figure 3:
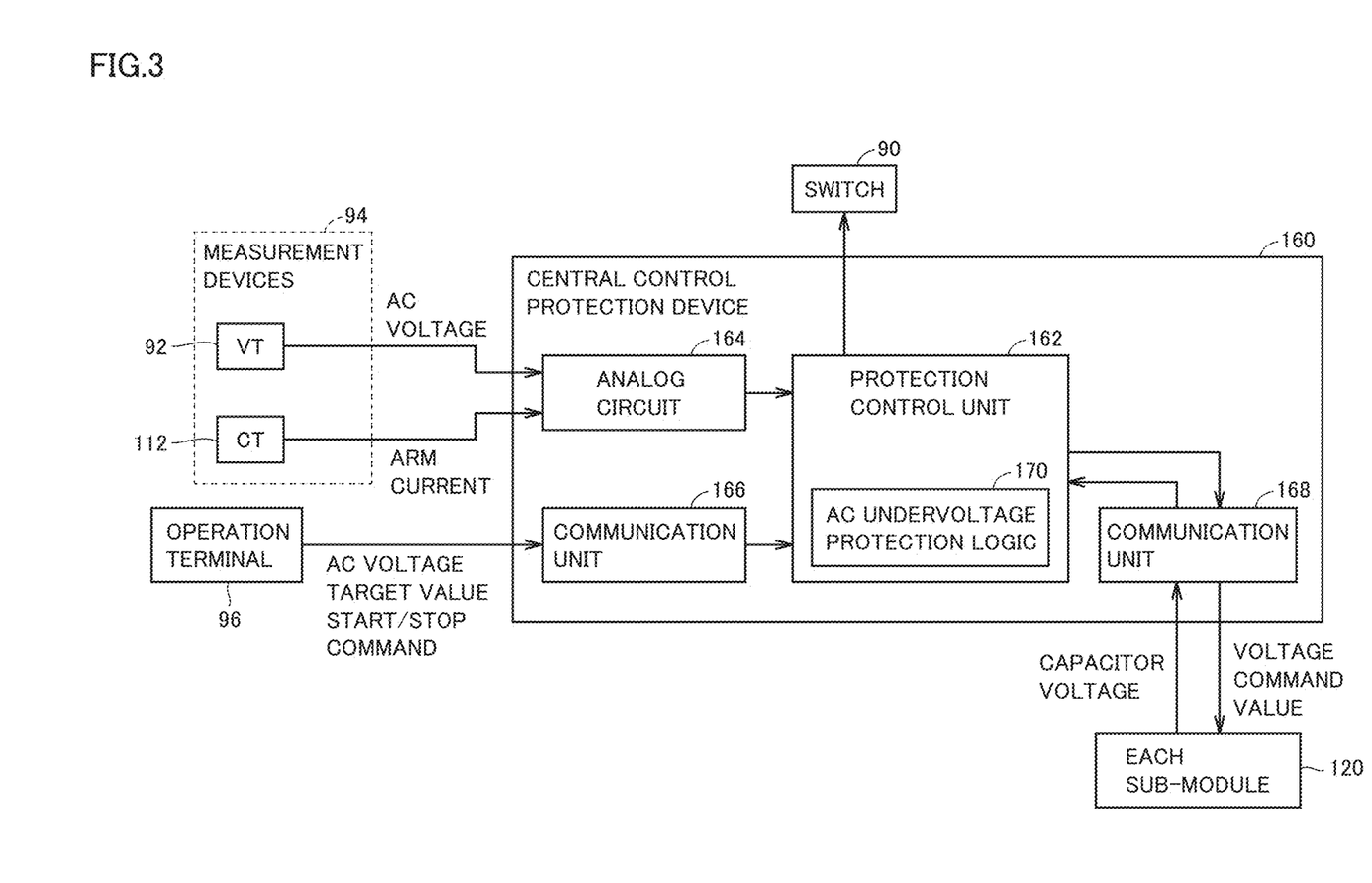
FIG. 3 is a block diagram showing an example of a functional configuration of a central control protection device in FIG. 1.

FIG. 3 is a block diagram showing an example of a functional configuration of the central control protection device in FIG. 1. Central control protection device 160 includes a protection control unit 162, an analog circuit 164, and communication units 166 and 168.

Protection control unit 162 may be configured as a dedicated circuit, or may be configured using an FPGA. Alternatively, the function of protection control unit 162 may be implemented by a microcomputer including a CPU, a memory, and the like. In the following, the function of protection control unit 162 will be described.

A system voltage and various kinds of information in reactive power compensation device 100 (such as the arm current) detected by measurement devices 94 such as voltage transformer 92 and current transformers 112 in FIG. 1 are input to protection control unit 162 via analog circuit 164. Analog circuit 164 includes an auxiliary transformer, an analog filter, an analog-to-digital (A/D) converter, and the like.

Further, protection control unit 162 is connected with an operation terminal 96 via communication unit 166, and receives inputs such as the AC voltage target value, a start/stop command, and the like. In addition, protection control unit 162 is connected with each sub-module 120 via communication unit 168, and receives information of the voltage value of DC capacitor 124 provided in each sub-module 120.

Based on the above input information, protection control unit 162 transmits the control command such as a voltage command value to each sub-module 120. For example, protection control unit 162 controls the AC voltage to be output from reactive power compensation device 100 to AC power system 80 such that the voltage of AC power system 80 gets closer to the AC voltage target value or fluctuations in the voltage of AC power system 80 are suppressed, while maintaining the DC capacitor voltage at a constant value.

In addition, based on the above input information, protection control unit 162 generates the protection command and transmits it to each sub-module 120, when AC power system 80 has an abnormality or when reactive power compensation device 100 may fail. In response to the protection command, each sub-module 120 is set to a standby state by setting all of semiconductor switching elements 132A, 132B, 132C, and 132D to an opened state.

In addition, protection control unit 162 starts reactive power compensation device 100 by closing switch 90 in response to a start command from the outside, and stops reactive power compensation device 100 by opening switch 90 in response to a stop command from the outside.

Protection control unit 162 may set reactive power compensation device 100 to a stopped state by opening switch 90 in response to the protection command output by itself, as described later. In the following, control for the standby state and the stopped state of reactive power compensation device 100 when the system voltage of AC power system 80 becomes lower than a predetermined lower limit voltage will be described in further detail.

[Exemplary Configuration of AC Undervoltage Protection Logic]

Figure 4:
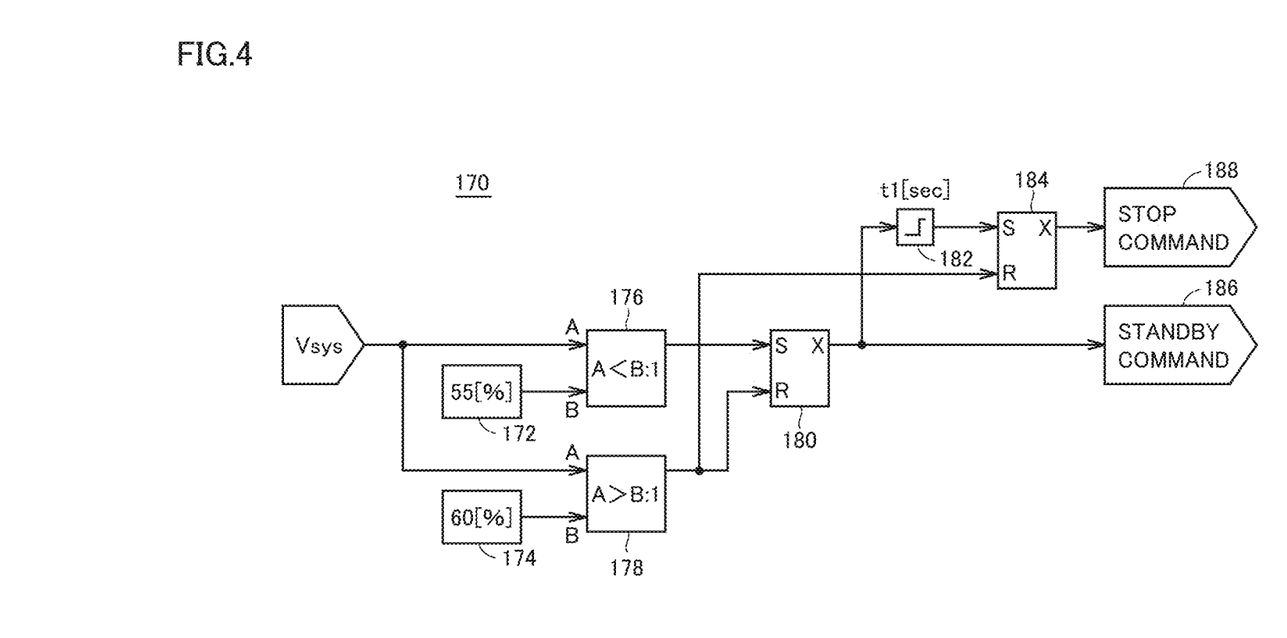
FIG. 4 is a diagram showing an exemplary configuration of an AC undervoltage protection logic provided in a protection control unit in FIG. 3.

FIG. 4 is a diagram showing an exemplary configuration of an AC undervoltage protection logic provided in the protection control unit in FIG. 3. An AC undervoltage protection logic 170 includes comparators 176 and 178, flip-flops 180 and 181, and an on-delay timer 182.

Comparator 176 outputs "1" when a system voltage Vsys of AC power system 80 becomes lower than a first threshold value 172 (for example, 55% of a rated voltage), and outputs "0" otherwise. Therefore, comparator 176 functions as a voltage reduction detection unit for detecting reduction of system voltage Vsys.

Comparator 178 outputs "1" when system voltage Vsys of AC power system 80 becomes higher than a second threshold value 174 (for example, 60% of the rated voltage), and outputs "0" otherwise. Second threshold value 174 is higher than first threshold value 172. Therefore, comparator 178 functions as a power restoration detection unit for detecting restoration of power to AC power system 80.

Flip-flop 180 operates as a standby command unit. When comparator 176 outputs "1", flip-flop 180 is set to a set state "1" and outputs a standby command 186. When comparator 178 outputs "1", flip-flop 180 is set to a reset state "0" and cancels standby command 186. Therefore, standby command 186 is output when reduction of system voltage Vsys is detected by the voltage reduction detection unit (comparator 176), and standby command 186 is canceled when power restoration is detected by the power restoration detection unit (comparator 178). The standby command is output to each sub-module 120, and each sub-module 120 that has received the standby command switches all of semiconductor switching elements 132A, 132B, 132C, and 132D to the opened state.

An output signal of flip-flop 180 is input to a set terminal of flip-flop 184 via on-delay timer 182. An output signal of comparator 178 is input to a reset terminal of flip-flop 184. When flip-flop 184 is in a set state, flip-flop 184 operates as a stop command unit for outputting a stop command 188. Therefore, when a time t1 [sec] determined by on-delay timer 182 has elapsed after standby command 186 is output by the standby command unit (flip-flop 180), the stop command unit (flip-flop 184) outputs stop command 188. In response to stop command 188, switch 90 in FIG. 1 is closed. Stop command 188 is canceled when power restoration is detected by the power restoration detection unit (comparator 178).

[Operation of AC Undervoltage Protection Logic]

Next, operation of AC undervoltage protection logic 170 will be described with reference to a timing chart of FIG. 5 and a flowchart of FIG. 6.

Figure 5:
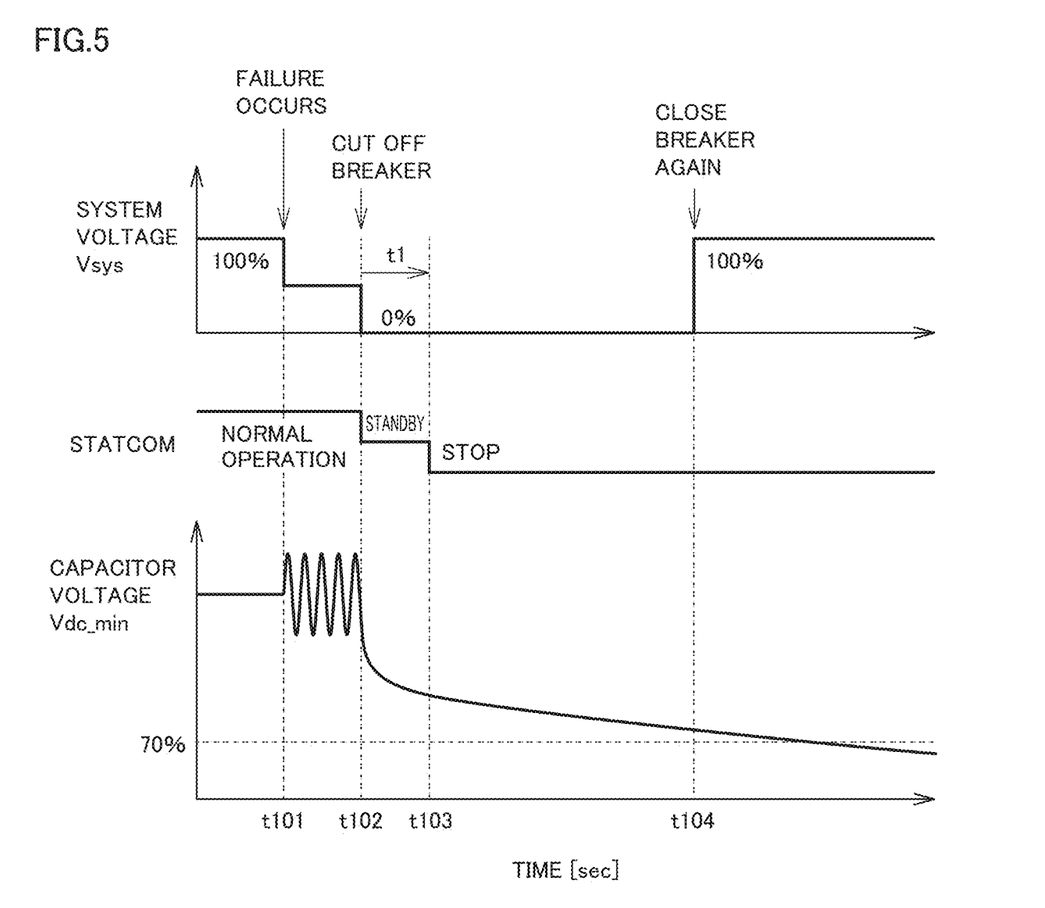
FIG. 5 is a timing chart showing changes in operation of a reactive power compensation device and a capacitor voltage in response to changes in a system voltage of an AC power system, in the reactive power compensation device of a first embodiment.

FIG. 5 is a timing chart showing changes in operation of the reactive power compensation device and the capacitor voltage in response to changes in the system voltage of the AC power system, in the reactive power compensation device of the first embodiment.

Referring to FIGS. 4 and 5, it is assumed that a failure occurs in AC power system 80 at a time point t101.

It is assumed that, at a next time point t102, a breaker (not shown) is cut off by a protection relay device (not shown) provided in AC power system 80. As a result, system voltage Vsys detected by voltage transformer 92 in FIG. 1 becomes 0 [V] (that is, AC power system 80 is set to a power failure state). By detecting this power failure state, reactive power compensation device 100 is set to the standby state (that is, standby command 186 is output). In the standby state, all of semiconductor switching elements 132A, 132B, 132C, and 132D of each sub-module 120 are set to an OFF state (opened state).

At a time point t103 when time t1 [sec] determined by on-delay timer 182 has elapsed since time point t102, reactive power compensation device 100 is set to the slopped stale (that is, stop command 188 is output).

At a time point t104, the breaker (not shown) is closed again, and thereby system voltage Vsys recovers to the rated voltage. On this occasion, if reactive power compensation device 100 remains in the standby state, reactive power compensation device 100 can immediately return to a normal state. However, if reactive power compensation device 100 is in the stopped state as shown in FIG. 5, it is necessary to restart reactive power compensation device 100, and it takes time to restart reactive power compensation device 100.

Figure 6:
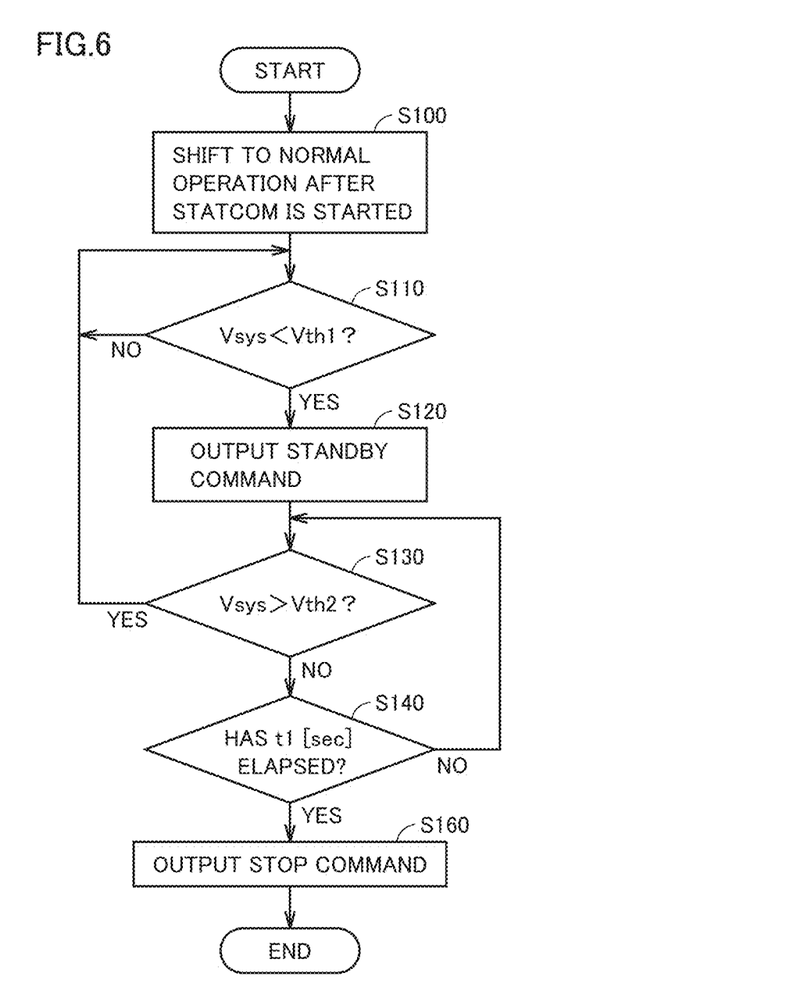
FIG. 6 is a flowchart showing operation of a central control protection device when the system voltage of the AC power system is reduced, in the reactive power compensation device of the first embodiment.

FIG. 6 is a flowchart showing operation of the central control protection device when the system voltage of the AC powder system is reduced, in the reactive power compensation device of the first embodiment. In the following, the description so far will be summarized with reference to FIGS. 1, 3, and 6.

In step S100, after reactive power compensation device 100 is started, the operation stare of reactive power compensation device 100 shifts to the normal state (also referred to as a normal mode). In the normal mode, switch 90 in FIG. 1 is in a closed state.

Then, it is assumed that, in step S110, AC undervoltage protection logic 170 detects that system voltage Vsys of AC power system 80 becomes lower than a threshold voltage Vth1 (172 in FIG. 4) (i.e., AC undervoltage) (YES in step S110). In this case, in step S120, AC undervoltage protection logic 170 outputs standby command 186 to each sub-module 120. Upon receiving standby command 186, all of semiconductor switching elements 132A, 132B, 132C, and 132D of each sub-module 120 are set to the OFF suite (opened state).

Then, it is assumed that system voltage Vsys recovers to a value higher than a threshold voltage Vth2 (174 in FIG. 4, Vth2>Vth1) before time t1 [sec] has elapsed after standby command 186 is output (NO in step S140, YES in step S130). In this case, the operation suite of reactive power compensation device 100 returns from the standby state (also referred to as a standby mode) to the normal state. That is, AC undervoltage protection logic 170 cancels standby command 186.

On the other hand, when system voltage Vsys does not recover to a value higher than threshold voltage Vth2 (174 in FIG. 4, Vth2>Vth1) even though time t1 [sec] has elapsed after standby command 186 is output (NO in step S130, YES in step S140), the operation state of reactive power compensation device 100 shifts from the standby state to the stopped state (also referred to as a stop mode). That is, in step S160, AC undervoltage protection logic 170 outputs stop command 188 to switch 90 and each sub-module 120 in FIG. 1. Upon receiving stop command 188, switch 90 is opened.

[Effect]

AC undervoltage protection logic 170 with the above configuration can achieve the following effect.

First, as a premise, DC capacitor 124, which serves as a supply source of the drive voltages for control device 140 of each sub-module 120, is charged by obtaining energy from AC power system 80. Accordingly, if a power failure occurs in AC power system 80 (at time point t102 in FIG. 4), DC capacitor 124 is gradually discharged and its voltage is reduced even when reactive power compensation device 100 itself does not have a failure, and as a result, it becomes impossible to control sub-module 120.

In order to prevent this, in reactive power compensation device 100 of the present embodiment, when system voltage Vsys of AC power system 80 becomes lower than the first threshold value (172 in FIG. 4), reactive power compensation device 100 is controlled to temporarily shift from the normal state to the standby state. Thereafter, when the standby slate is continued for a predetermined time (time t1 in FIGS. 4 and 5) or more, reactive power compensation device 100 is controlled to shift to the stopped state.

When AC power system 80 temporarily has a power failure and thereafter power is restored to AC power system 80, reactive power compensation device 100 can be immediately restarted if it is in the standby state when power is restored. Therefore, according to the present embodiment, it is possible to provide a reactive power compensation device that can be restarted as soon as possible when power is restored after a power failure.

However, if reactive power compensation device 100 is in the stopped state when power is restored, it takes time to restart reactive power compensation device 100. An upper limit time of the standby state is set in consideration of various cases, such that each sub-module 120 does not become out of control.

Second Embodiment

[Problem in First Embodiment and Characteristic in Second Embodiment]

It is desirable that reactive power compensation device 100 can be immediately restarted upon restoration of power after a power failure in AC power system 80. That is, it is required that the standby state can be continued as long as possible during the power failure in AC power system 80.

On the other hand, however, when a system accident occurs due to lightning, for example, the DC capacitor voltage of each sub-module 120 may fluctuate sharply from when the system accident occurs to when the breaker is cut off (see from time point t101 to time point t102 in FIG. 5). In such a case, the voltage value of the DC capacitor after the power failure occurs is lower when compared with a case where other failures occur. As a result, the DC capacitor voltage may be reduced to a voltage level at which control device 140 of sub-module 120 cannot be controlled, faster when compared with the case where other failures occur.

Therefore, in the first embodiment, the time for which the standby mode can be continued is limited, because it is necessary to consider the worst case as described above. As a result, the operation state of reactive power compensation device 100 often shifts from the standby state to the stopped state before the DC capacitor voltage is reduced to the voltage level at which control device 140 of sub-module 120 cannot be controlled.

A reactive power compensation device of a second embodiment is configured to shift from the standby state to the stopped state when a minimum value of the voltage of the DC capacitor of each sub-module 120 becomes lower than a lower limit voltage. As a result, it is possible to provide a reactive power compensation device that can be restarted as soon as possible when power is restored to an AC power system after a power failure.

In the following, a detailed description will be given with reference to the drawings. It should be noted that the overall configuration of reactive power compensation device 100 in FIG. 1, the configuration of each sub-module 120 in FIG. 2, and the configuration of central control protection device 160 in FIG. 3 (except for the configuration of AC undervoltage protection logic 170) are common in the first embodiment and the second embodiment, and the description thereof will not be repeated.

[Exemplary Configuration of AC Undervoltage Protection Logic]

Figure 7:
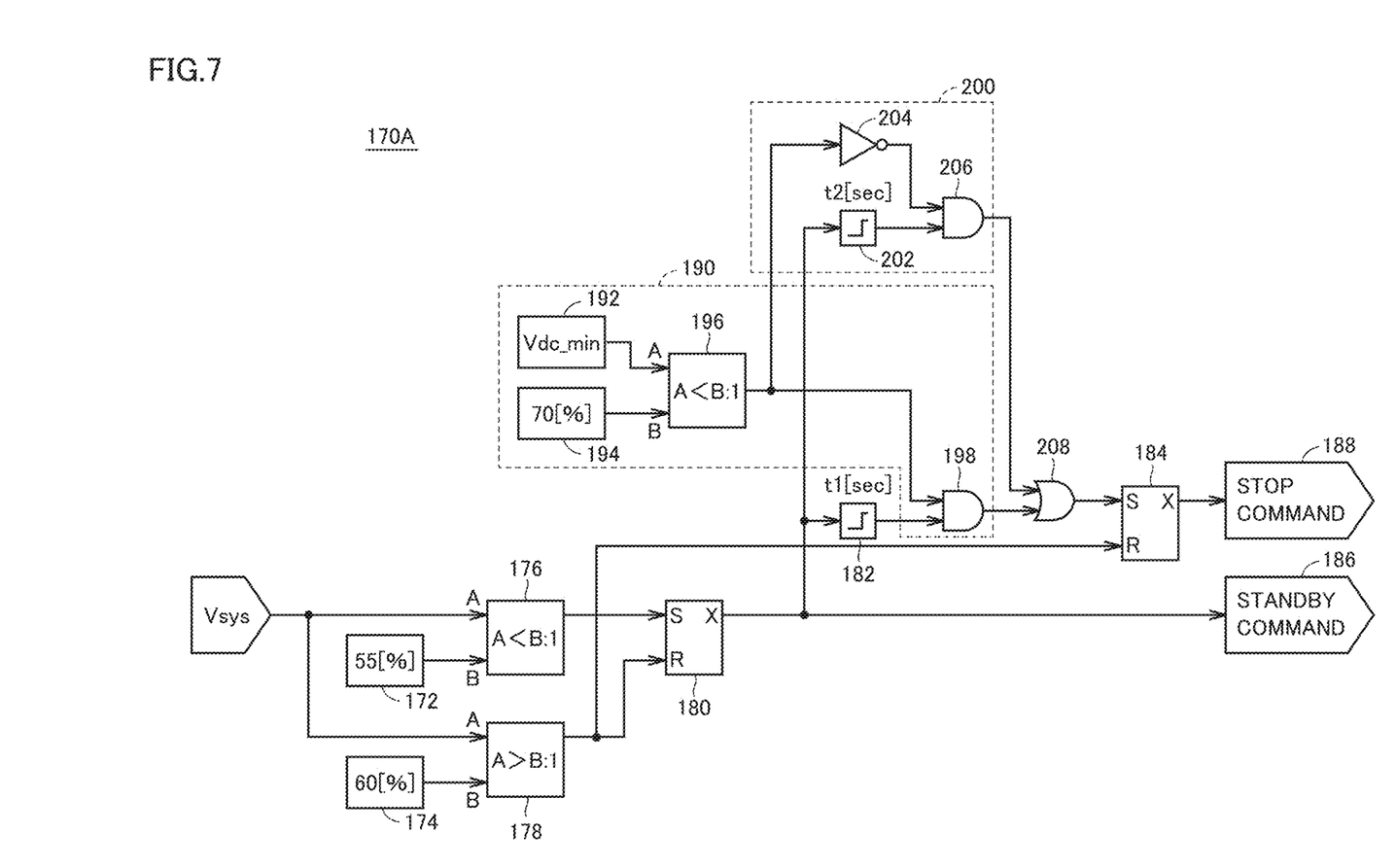
FIG. 7 is a circuit diagram showing an exemplary configuration of an AC undervoltage protection logic in a reactive power compensation device of a second embodiment.

FIG. 7 is a circuit diagram showing an exemplary configuration of an AC undervoltage protection logic in the reactive power compensation device of the second embodiment.

An AC undervoltage protection logic 170A in FIG. 7 is different from AC undervoltage protection logic I/O in FIG. 4 in that it further includes a DC undervoltage detection unit 190, a standby time limitation unit 200, and an OR gate 208. Standby time limitation unit 200 and OR gate 208 do not necessarily have to be provided. Since other components in FIG. 7 are the same as those in FIG. 4, identical or corresponding parts will be designated by the same reference numerals, and the description thereof will not be repeated.

DC undervoltage detection unit 190 detects that a minimum value Vdc_min of the DC capacitor voltage of each sub module 120 becomes lower than a lower limit value. Specifically, DC undervoltage detection unit 190 includes a comparator 196 and an AND gate 198.

Comparator 196 outputs "1" when minimum value Vdc_min of the DC capacitor voltage value obtained from each sub-module 120 becomes lower than a lower limit value 194 (for example, 70% of a standard value), and outputs "0" otherwise.

AND gate 198 receives an output of on-delay timer 182 and an output of comparator 196, and outputs a logical multiplication thereof. Therefore, AND gate 198 outputs "1" when minimum value Vdc_min of the DC capacitor voltage becomes lower than the lower limit value after time t1 [sec] has elapsed since the shift to the standby state, and outputs "0" otherwise. An output of AND gate 198 is input to the set terminal of flip-flop 184 via OR gate 208. Thereby, when AND gate 198 outputs "1", stop command 188 is output from flip-flop 184.

Standby time limitation unit 200 determines whether or not a time t2 [sec] (an upper limit lime of the standby mode, t2>t1) has elapsed since the shift to the standby state. Specifically, standby time limitation unit 200 includes an on-delay timer 202, an inverter 204, and an AND gate 206.

On-delay timer 202 outputs "1" when time t2 [sec] has elapsed after standby command 186 is output by the standby command unit (flip-flop 180). AND gate 206 outputs a logical multiplication of an output of on-delay timer 202 and a signal obtained by inverting an output of comparator 196. Therefore, standby time limitation unit 200 outputs "1" when time t2 [sec] has elapsed after standby command 186 is output and minimum value Vdc_min of the DC capacitor voltage becomes lower than the lower limit value, and outputs "0" otherwise.

An output of AND gate 206 is input to the set terminal of flip-flop 184 via OR gate 208. Thereby, when AND gate 206 outputs "1", stop command 188 is output from flip-flop 184.

[Operation of AC Undervoltage Protection Logic]

Next, operation of AC undervoltage protection logic 170A will be described with reference to a timing chart of FIG. 8 and a flowchart of FIG. 9.

Figure 8:
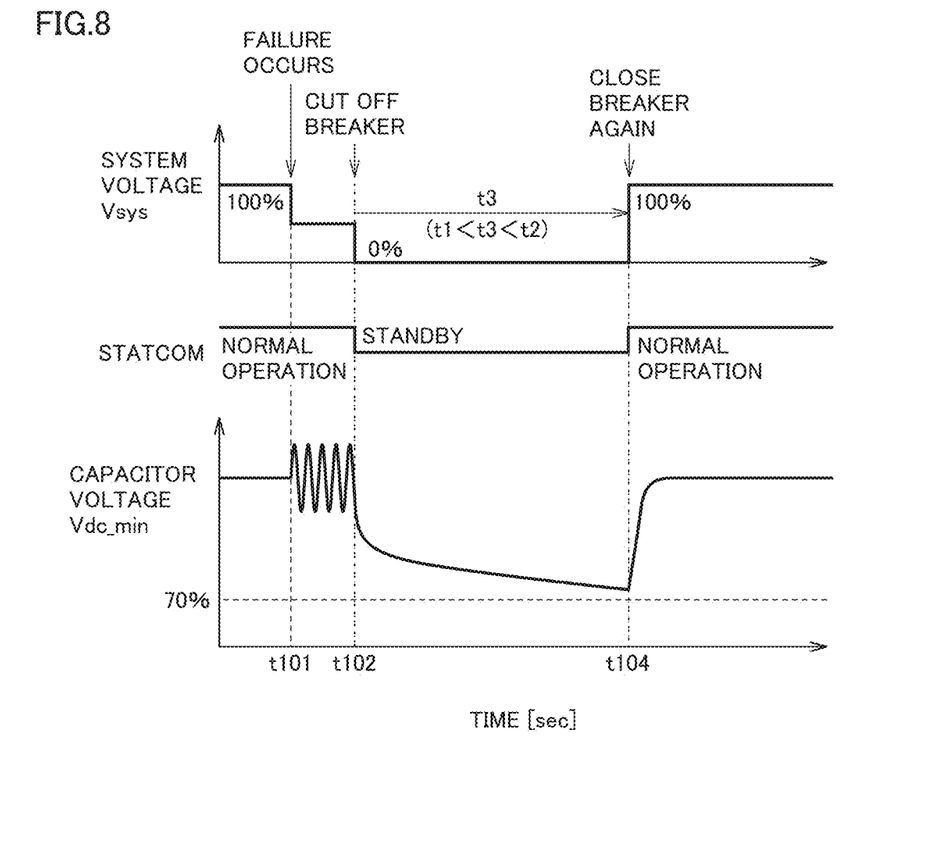
FIG. 8 is a timing chart showing changes in operation of the reactive power compensation device and a capacitor voltage in response to changes in a system voltage of an AC power system, in the reactive power compensation device of the second embodiment.

FIG. 8 is a timing chart showing changes in operation of the reactive power compensation device and the capacitor voltage in response to changes in the system voltage of the AC power system, in the reactive power compensation device of the second embodiment.

Referring to FIGS. 7 and 8, it is assumed that a failure occurs in AC power system 80 at time point t101.

At next time point t102, a breaker (not shown) is cut off by a protection relay device (not shown) provided in AC power system 80. As a result, system voltage Vsys detected by voltage transformer 92 in FIG. 1 becomes 0 [V]. By detecting this power failure state, reactive power compensation device 100 is set to the standby state (that is, standby command 186 is output). In the standby state, all of semiconductor switching elements 132A, 132B, 132C, and 132D of each sub-module 120 are set to the OFF state (opened state).

At time point t104, the breaker (not shown) is closed again, and thereby system voltage Vsys recovers to the rated voltage. On this occasion, if reactive power compensation device 100 remains in the standby state as shown in FIG. 8, reactive power compensation device 100 can immediately return to the normal state. Specifically, since minimum value Vdc_min of the DC capacitor voltage is not lower than the lower limit value (70% of the standard value in the case of FIG. 8) at time point t104, it can be seen that the standby state is maintained. It should be noted that a power failure time t3 [sec] taken from when the breaker (not shown) is cut off to when the breaker is closed again is set to be longer than time t1 and shorter than time t2 in FIG. 7.

Figure 9:
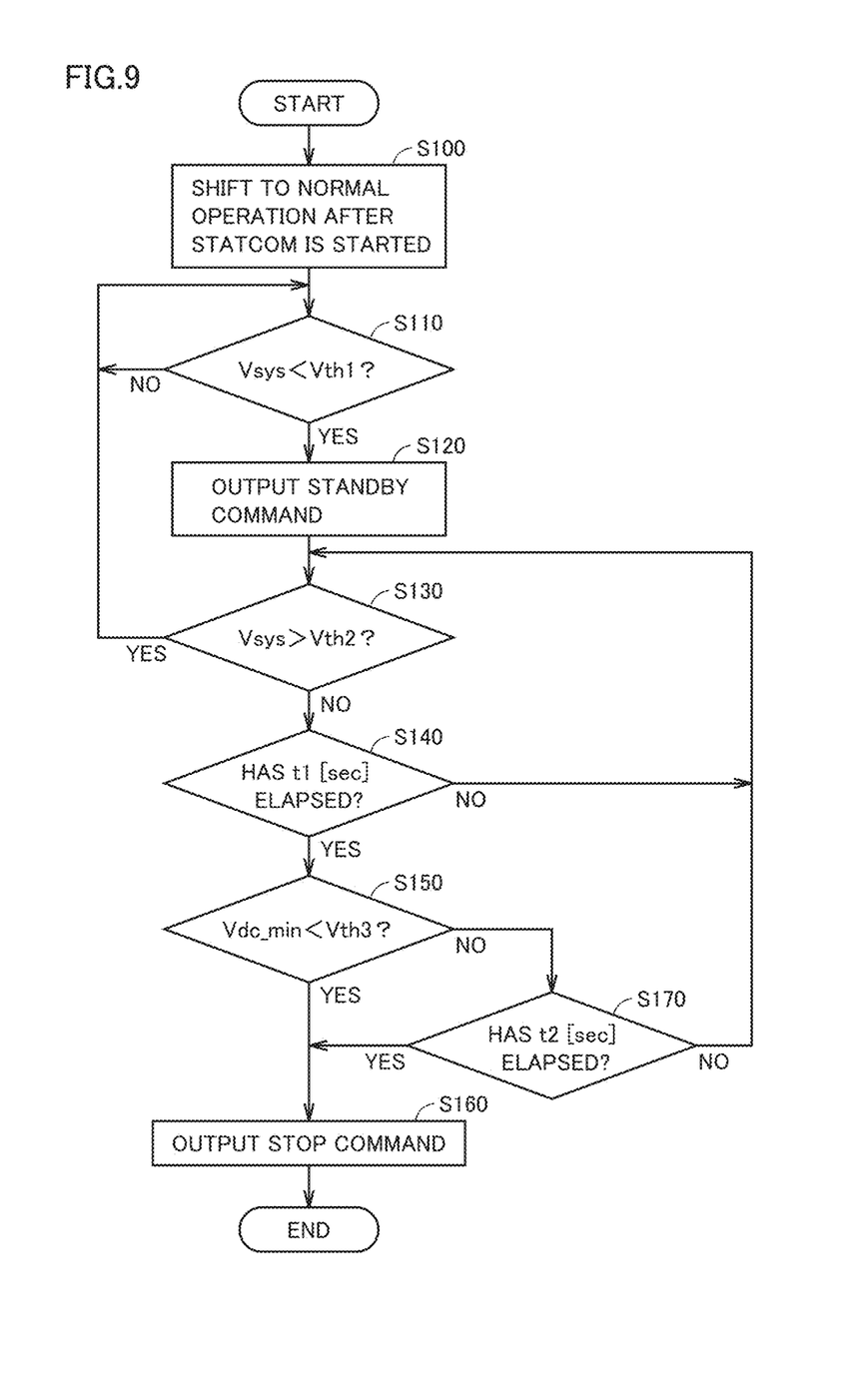
FIG. 9 is a flowchart showing operation of a central control protection device when the system voltage of the AC power system is reduced, in the reactive power compensation device of the second embodiment.

FIG. 9 is a flowchart showing operation of the central control protection device when the system voltage of the AC power system is reduced, in the reactive power compensation device of the second embodiment. In the following, the description so far will be summarized with reference to FIGS. 1, 3, and 9.

In step S100, reactive power compensation device 100 is started, and thereafter the operation state of reactive power compensation device 100 shifts to the normal state.

Then, it is assumed that, in step S110, AC undervoltage protection logic 170A detects that system voltage Vsys of AC power system 80 becomes lower than threshold voltage Vth1 (172 in FIG. 7) (i.e., AC undervoltage) (YES in step S110). In this case, in step S120, AC undervoltage protection logic 170A outputs standby command 186 to each sub-module 120.

Then, it is assumed that system voltage Vsys recovers to a value higher than threshold voltage Vth2 (174 in FIG. 7, Vth2>Vth1) after standby command 186 is output and before stop command 188 is output (YES in step S130). In this case, the operation state of reactive power compensation device 100 returns from the standby state to the normal state That is, AC undervoltage protection logic 170A cancels standby command 186.

On the other hand, after standby command 186 is output, in step S150, reactive power compensation device 100 determines whether or not minimum value Vdc_min of the DC capacitor voltage of each sub-module 120 becomes lower than a lower limit value Vth3. As a result, when time t1 [sec] has elapsed since the shift to the standby state (YES in step S140) and minimum value Vdc_min of the DC capacitor voltage of each sub-module 120 becomes lower than lower limit value Vth3 (YES in step S150), the operation state of reactive power compensation device 100 shifts from the standby state to the stopped state. That is, in step S160, AC under voltage protection logic 170A outputs stop command 188 to switch 90 and each sub-module 120 in FIG. 1.

It should be noted that, although the operation state is controlled based on the minimum value of the voltages of all the DC capacitors in the above description, the operation state of reactive power compensation device 100 may be controlled based on the minimum value of the DC capacitor voltages of a plurality of representative sub-modules. Therefore, if the minimum value of the voltage values of at least some of the DC capacitors becomes lower than the lower limit value, the operation state of reactive power compensation device 100 shifts front the standby state to the stopped state.

In step S150, when minimum value Vdc_min of the DC capacitor voltage of each sub-module 120 does not become lower than lower limit value Vth3 (NO in step S150) and time t2 [sec] has not elapsed since the shift to the standby state (NO in step S170), reactive power compensation device 100 returns to step S130, and the standby state is continued.

When time t2 [sec] (the upper limit time of the standby mode) has elapsed since the shift to the standby state (YES in step S170), the operation state of reactive power compensation device 100 shifts from the standby state to the stopped state. It should be noted that step S170 is not necessarily required. That is, when minimum value Vdc_min of the DC capacitor voltage of each sub-module 120 becomes lower than lower limit value Vth3, the operation state of reactive power compensation device 100 may shift from the standby state to the slopped state, and otherwise the standby state may be continued.

[Effect]

As described above, the reactive power compensation device of the second embodiment is configured such that the operation state of the reactive power compensation device shifts from the standby state to the stopped state when the minimum value of the DC capacitor voltage becomes lower than the lower limit value. Thereby, the standby state can be continued for a longer time when compared with the first embodiment. As a result, it is possible to provide a reactive power compensation device that can be restarted as soon as possible when power is restored to an AC power system after a power failure.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

80: AC power system; 82: transformer; 90: switch, 92: voltage transformer; 94: measurement devices; 96: operation terminal; 100 reactive power compensation device; 110, 110A, 110B, 110C: arm circuit; 112: current transformer; 120: sub-module; 122N, 122P: input/output node; 124: DC capacitor; 126N: low potential-side node; 126P: high potential-side node; 130: bridge circuit; 132A, 132B, 132C, 132D: semiconductor switching element; 134A, 134B, 134C, 134D: diode; 140: control device; 142: feed circuit; 144: gate logic; 146: gate drive circuit; 148: communication circuit; 150: voltage detector; 160: central control protection device; 162: protection control unit; 164: analog circuit; 166, 168: communication unit; 170, 170A: AC undervoltage protection logic; 176, 178, 196: comparator; 180, 184: flip-flop; 182, 202: on-delay timer; 190: DC undervoltage detection unit; 198, 206: AND gate; 200: standby time limitation unit; 204: inverter; 208: OR gate.

The invention claimed is:

1. A reactive power compensation device connected with an AC power system via a switch, the reactive power compensation device comprising:
    an arm circuit having a plurality of sub-modules connected in series;
    each of the sub-modules including:
        a DC capacitor; and
        a bridge circuit for switching whether or not to output a voltage held in the DC capacitor; and
    a central control protection device configured to control the sub-modules and the switch,
    the central control protection device being configured to shift to a standby mode in which all semiconductor switching elements constituting the bridge circuit of each of the sub-modules are set to an opened state, with the switch being set to a closed state, when the AC power system has a power failure during operation of the reactive power compensation device,
    the central control protection device being configured to obtain information of voltage values of the DC capacitors of at least some of the sub-modules;
    the central control protection device being configured to shift from the standby mode to a stop mode in which the switch is set to an opened state, when a minimum value of the voltage values of the DC capacitors of the at least some of the sub-modules is lower then a lower limit value in the standby mode.

2. The reactive power compensation device according to claim 1, wherein the central control protection device is configured to shift to the stop mode after a predetermined upper limit time has elapsed in the standby mode.

3. The reactive power compensation device according to claim 2, wherein the central control protection device is configured to cancel the standby mode when the power failure in the AC power system is resolved in the standby mode.

4. The reactive power compensation device according to claim 1, wherein the central control protection device is configured to cancel the standby mode when the power failure in the AC power system is resolved in the standby mode.

5. The reactive power compensation device according to claim 1, wherein
the central control protection device includes:
a first comparator configured to compare a voltage value of the AC power system with a first threshold value;
a second comparator configured to compare the voltage value of the AC power system with a second threshold value that is higher than the first threshold value; and
a first flip-flop configured to be set to a set state when the voltage value of the AC power system is lower than the first threshold value, and to be set to a reset state when the voltage value of the AC power system is higher than the second threshold value, and
the central control protection device is in the standby mode when the first flip-flop is in the set state.

6. The reactive power compensation device according to claim 5, wherein
the central control protection device further includes:
a third comparator configured to compare the minimum value of the voltage values of the DC capacitors of the at least some of the sub-modules with the lower limit value; and
a second flip-flop configured to be set to a set state when the first flip-flop is in the set state and the minimum value of the voltage values of the DC capacitors of the at least some of the sub-modules is lower than the lower limit value, and to be set to a reset state when the voltage value of the AC power system is higher than the second threshold value, and
the central control protection device is in the stop mode when the second flip-flop is in the set state.

7. The reactive power compensation device according to claim 6, wherein
the central control protection device further includes a standby time limitation unit configured to determine whether or not an upper limit time of the standby mode has elapsed after the first flip-flop is set to the set state, and
the second flip-flop is configured to be set to the set state when the upper limit time of the standby mode has elapsed after the first flip-flop is set to the set state.

8. A method for controlling a reactive power compensation device connected with an AC power system via a switch,
the reactive power compensation device including an arm circuit having a plurality of sub-modules connected in series,
each of the sub-modules including:
a DC capacitor; and
a bridge circuit for switching whether or not to output a voltage held in the DC capacitor,
the method for controlling comprising:
shifting to a standby mode in which all semiconductor switching elements constituting the bridge circuit of each of the sub-modules are set to an opened state, with the switch being set to a closed state, when the AC power system has a power failure during operation of the reactive power compensation device;
obtaining information of voltage values of the DC capacitors of at least some of the sub-modules; and
shifting from the standby mode to a stop mode in which the switch is set to an opened state, when a minimum value of the voltage values of the DC capacitors of the at least some of the sub-modules is lower than a lower limit value in the standby mode.

9. The method for controlling the reactive power compensation device according to claim 8, wherein the shifting to the stop mode is performed when a predetermined upper limit time has elapsed in the standby mode.

10. The method for controlling the reactive power compensation device according to claim 9, further comprising canceling the standby mode when the power failure in the AC power system is resolved in the standby mode.

11. The method for controlling the reactive power compensation device according to claim 8, further comprising canceling the standby mode when the power failure in the AC power system is resolved in the standby mode.

* * * * *